United States Patent [19]

von der Crone et al.

[11] 4,165,319

[45] Aug. 21, 1979

[54] ISOINDOLINE PIGMENTS

[75] Inventors: Jost von der Crone, Riehen; Christoph Frey, Aesch, both of Switzerland

[73] Assignee: Ciba-Geigy Corporation, Ardlsey, N.Y.

[21] Appl. No.: 816,839

[22] Filed: Jul. 18, 1977

[30] Foreign Application Priority Data

Jul. 26, 1976 [CH] Switzerland ............... 9621/76

[51] Int. Cl.$^2$ ............... C07D 208/46; C07D 209/50
[52] U.S. Cl. ............... 260/325 PH; 106/23; 106/288 Q; 260/30.2; 260/37 P; 260/42.21; 260/304 P; 260/305; 260/307 G; 260/308 B; 260/315; 260/326.1; 260/465 D; 260/570 D; 260/575; 260/578; 548/327; 546/103; 546/273
[58] Field of Search ............... 260/325 PH, 326.1

[56] References Cited

U.S. PATENT DOCUMENTS

| | | | |
|---|---|---|---|
| 3,594,319 | 7/1971 | Vollmann et al. | 260/326.1 |
| 3,971,805 | 7/1976 | Model | 260/325 PH |
| 3,991,054 | 11/1976 | Bock et al. | 260/326.1 |
| 4,051,099 | 9/1977 | von der Crone | 260/326.1 |

*Primary Examiner*—Alton D. Rollins
*Attorney, Agent, or Firm*—Vincent J. Cavalieri; Joseph F. DiPrima

[57] ABSTRACT

Bis-isoindoline pigments of the formula

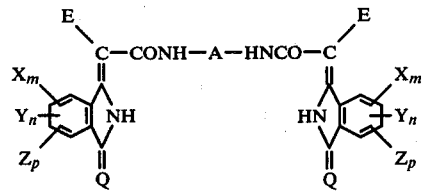

wherein
A represents a carbocyclic or heterocyclic aromatic radical,
Q represents an oxygen atom or an imino group,
E represents a cyano or acetyl group, a group of the formula —COOR, wherein R represents a $C_1$–$C_4$-alkyl group or a phenyl group which is unsubstituted or substituted in the o-, p- or m-position by halogen atoms, $C_1$–$C_4$-alkyl or $C_1$–$C_4$-alkoxy groups, or represents a group of the formula —CONHR$_1$, wherein R$_1$ represents a hydrogen atom, a $C_1$–$C_4$-alkyl group or a phenyl group which is unsubstituted or substituted in the o-, p- or m-position by halogen atoms or $C_1$–$C_4$-alkyl or $C_1$–$C_4$-alkoxy groups.
X represents a hydrogen atom,
Y represents a chlorine or bromine atom,
m and n are integers from 0 to 4,
p is an integer from 0 to 1, while the sum of m+n+p must be 4, and
Z if p is 1 and m is 3, represents a nitro or $C_2$–$C_5$-alkoxycarbonyl group and, if p is 1 and n is 3, represents a chlorine atom or a group of the formula RW—, wherein R has the above meaning and W represents an oxygen or sulphur atom are valuable pigments coloring plastics, lacquers and printing inks in yellow to red shades of excellent fastness properties.

7 Claims, No Drawings

ISOINDOLINE PIGMENTS

The present invention relates to useful novel bis-isoindoline pigments which are characterised by a particularly high degree of fastness in the pigmentation of lacquers, plastics and printing inks.

Monocyanomethylenisoindolinones are already known as intermediates for the manufacture of dyes, for example from DAS No. 1,268,621 and DOS No. 2,359,791.

It has now been found that bis-isoindoline pigments of the formula

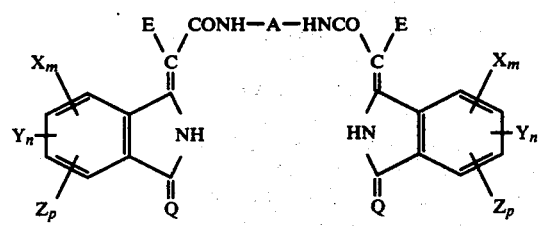
(I)

wherein
- A represents a carbocyclic or heterocyclic aromatic radical,
- Q represents an oxygen atom or an imino group,
- E represents a cyano or acetyl group, a group of the formula -COOR, wherein R represents a $C_1$-$C_4$-alkyl group or a phenyl group which is unsubstituted or substituted in the o-, p- or m-position by halogen atoms, $C_1$-$C_4$-alkyl or $C_1$-$C_4$-alkoxy groups, or represents a group of the formula —$CONHR_1$, wherein $R_1$ represents a hydrogen atom, a $C_1$-$C_4$-alkyl group or a phenyl group which is unsubstituted or substituted in the o-, p- or m-position by halogen atoms or $C_1$-$C_4$-alkyl or $C_1$-$C_4$-alkoxy groups,
- X represents a hydrogen atom,
- Y represents a chlorine or bromine atom,
- m and n are integers from 0 to 4,
- p is an integer from 0 to 1, whilst the sum of m+n+p must be 4, and
- Z if p is 1 and m is 3, represents a nitro or $C_2$-$C_5$-alkoxycarbonyl group and, if p is 1 and n is 3, represents a chlorine atom or a group of the formula RW-, wherein R has the above meaning and W represents an oxygen or sulphur atom, are characterised by a particularly high degree of fastness.

Interesting pigments are the bis-isoindoline-cyanoacetamides of the formula

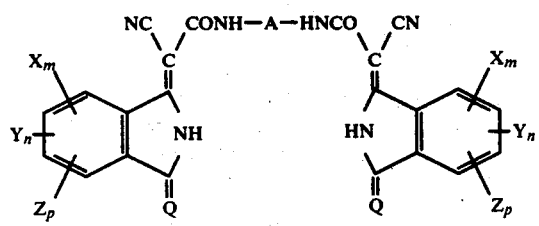
(II)

wherein Q, X, Y, Z, m, n and p are as defined in formula (I) and A represents an arylene group or a group of the formula

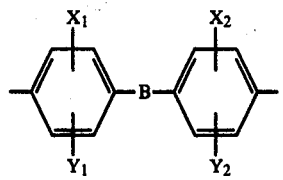
(III)

wherein B represents a direct bond, an oxygen or sulphur atom, a $C_1$-$C_4$-alkylene or $C_1$-$C_4$-alkylenedioxy group, a phenylenedioxy group, an azo, sulpho or carbamoyl group and each of $X_1$, $X_2$, $Y_1$ and $Y_2$ independently represents a hydrogen or chlorine atom or a $C_1$-$C_4$-alkyl or $C_1$-$C_4$-alkoxy group.

Particularly interesting pigments are the bis-isoindolines of the formula (II), wherein Q, X, Y, Z, m, n and p are as defined in formula (I) and A represents a phenylene group of the formula

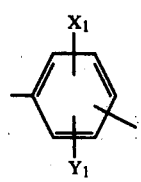
(IV)

wherein $X_1$ and $Y_1$ are as defined in formula (III), or represents an unsubstituted 1,5- or 2,6-naphthylene group or a group of the formula III.

Preferred pigments are bis-isoindolinone-(1) pigments of the formula

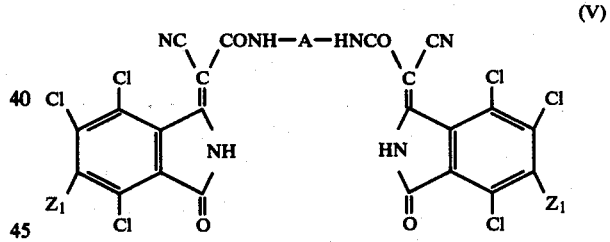
(V)

wherein A represents a group of the formula (III) or (IV) or an unsubstituted 1,5- or 1,6-naphthylene group and $Z_1$ represents a chlorine atom or a group of the formula $R_2$—O—, wherein $R_2$ represents a methyl or ethyl group or a phenyl group which is unsubstituted or substituted in the o-, p- or m-position by chlorine atoms or methyl groups.

Preferred pigments are also bis-isoindoline pigments of the formula

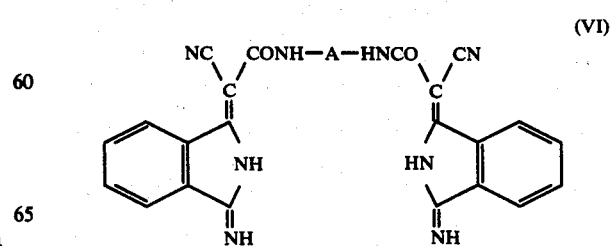
(VI)

wherein A represents a group of the formula (III) or (IV) or an unsubstituted 1,5- or 1,6-naphthylene group.

Particularly preferred pigments are those of the formulae (V) and (VI), wherein A represents the group of the formula

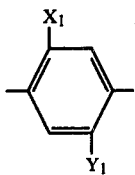   (VII)

or the group of the formula

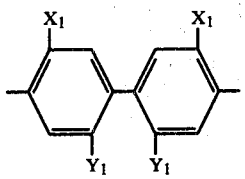   (VIII)

wherein each of $X_1$ and $Y_1$ independently represents a hydrogen or chlorine atom or a methyl, ethyl, methoxy or ethoxy group.

A —COOR group represented by E is a methyl-, ethyl-, n-propyl-, isopropyl-, n-butyl-, tert.-butyl-, phenyl-, p-chlorophenyl-, m-chlorophenyl-, p-tolyl-, p-methoxyphenyl-, o-ethoxyphenyl-, p-tert.-butoxyphenylcarboxylic acid ester group, but in particular a methyl-, ethyl- or phenylcarboxylic acid ester group.

A —CONHR group represented by E is a carbamoyl group or a methyl-, ethyl-, n-propyl-, isopropyl-, n-butyl-, tert.-butyl-, phenyl-, p-chlorophenyl-, m-chlorophenyl-, p-tolyl-, p-methoxyphenyl-, o-ethoxyphenyl-, p-tert.-butoxyphenylcarbamoyl group, but in particular a carbamoyl or methyl-, ethyl- or phenylcarbamoyl group.

An alkoxycarbonyl group represented by Z is for example the methoxy-, ethoxy-, propoxy-, isopropoxy-, n-butoxy-, sec.-butoxy or tert.-butoxycarbonyl group, but preferably the methoxycarbonyl group.

A group of the formula RW- represented by Z is for example a methoxy, ethoxy, n-propoxy, isopropoxy, n-butoxy, tert.-butoxy, phenoxy, p-chlorophenoxy, m-chlorophenoxy, o-chlorophenoxy, p-methylphenoxy, p-ethoxyphenoxy, methylmercapto, ethylmercapto, tert.-butylmercapto, phenylmercapto, p-chlorophenylmercaptor, p-methoxyphenylmercaptor or m-chlorophenylmercapto group, but in particular a methoxy, ethoxy, phenoxy, p-chlorophenoxy or methylmercapto group.

A phenylene group of the formula (IV) represented by A is for example the unsubstituted p- or m-phenylene group or the 2-chloro-1,4-phenylene, 2-methyl-1,4-phenylene, 2-ethyl-1,4-phenylene, 2-n-propyl-1,4-phenylene, 2-isopropyl-1,4-phenylene, 2-tert.-butyl-1,4-phenylene, 2-methoxy-1,4-phenylene, 2-ethoxy-1,4-phenylene, 2-tert.-butoxy-1,4-phenylene, 2,5-dichloro-1,4-phenylene, 2,5-dimethyl-1,4-phenylene, 2,5-diethyl-1,4-phenylene, 2,5-dimethoxy-1,4-phenylene, 2,5-diethoxy-1,4-phenylene, 2-chloro-5-methyl-1,4-phenylene, 2-chloro-5-methoxy-1,4-phenylene, 2-methyl-5-methoxy-1,4-phenylene, 2,6-dichloro-1,4-phenylene, 2,6-dimethyl-1,4-phenylene, 2-chloro-6-methoxy-1,4-phenylene, 2-chloro-1,3-phenylene, 2-methyl-1,3-phenylene, 2-methoxy-1,3-phenylene, 2,5-dichloro-1,3-phenylene, 2,5-dimethyl-1,3-phenylene, or 2-chloro-5-methyl-1,3-phenylene group, but in particular the unsubstituted p-phenylene group or a 1,4-phenylene group which is monosubstituted in the 2-position by chlorine atoms, methyl, methoxy or ethoxy groups or disubstituted in the 2,5-position in like manner or differently.

A group of the formula (III) represented by A, wherein B represents a direct bond, is for example the unsubstituted 4,4'-biphenylylene group, or the 3,3'-dichloro-, 3,3'-dimethyl-, 3,3'-diethyl-, 3,3'-diisopropyl-, 3,3'-di-n-butyl-, 3,3'-di-tert.-butyl-, 3,3'-dimethoxy-, 3,3'-diethoxy-, 3,3'-di-tert.-butoxy-, 3,3',5,5'-tetrachloro-, 3,3',5,5'-tetramethyl-, 3,3',5,5'-tetramethoxy-, 3,3'-dichloro-5,5'-dimethyl-, 3',3'-dichloro-5,5'-dimethoxy-, 3,3'-dimethyl-5,5'-dimethoxy-4,4'-biphenylylene group, but is in particular a biphenylylene group which is disubstituted in the 3,3'-position in like manner by chlorine atoms, methyl, methoxy or ethoxy groups.

A group of the formula (III) represented by A, wherein B does not represent a direct bond, can be for example a p,p'-diphenylylene ether, p,p'-diphenylylene-sulphide, p,p'-di-phenylylene-sulpho, p,p'-diphenylylene-azo, p,p'-diphenylylene-methane, p,p'-diphenylylene-ethane, p,p'-diphenylylene-n-propane, p,p'-diphenylylene-isopropane, p,p'-diphenylylene-n-butane, p,p'-diphenylylene-tert.-butane, p,p'-diphenylyene-carbamide, p,p'-diphenylylene-dioxymethane, p,p'-diphenylylene-dioxybenzene group which is substituted in accordance with the above mentioned biphenylylene derivatives, but which is preferably unsubstituted.

A also represents for example the 1,5-anthraquinonediyl, 1,4-anthraquinone-diyl, 1,4-acridone-diyl, 2,7-fluorenediyl, 3,8-pyrene-diyl, 2,6-pyridine-diyl, 2,7-carbazole-diyl, 3,6-dibenzofurane-diyl, 2,6-dibenzofurane-diyl, 2,7-dibenzofurane-dyl, 6,4'-(2-phenyl)-benzthiazole-diyl, 2,6-benzthiazole-diyl, 2,6-benzimidazole-diyl, 4,4''-(2,5-bisphenyl)-oxdiazole-diyl, 6,4'-(2-phenyl)-benztriazole-diyl, 2,7-diphenylylene-sulpho group.

The bis-isoindoline pigments of the present invention are obtained by condensing an isoindoline of the formula

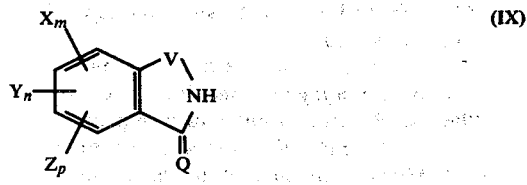   (IX)

wherein Q, X, Y, Z, m, n and p have the indicated meanings and V represents a group of the formula

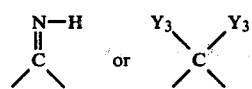

in which $Y_3$ represents a halogen atom, in particular a chlorine or bromine atom, a $C_1$–$C_4$-alkoxy group or a secondary amino group, with a bis-acetamide of the formula

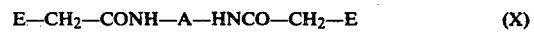   (X)

wherein A and E have the indicated meanings, in the molar ratio 2:1.

Particularly interesting compounds are those which are obtained by starting from isoindolines of the formula (IX) wherein V represents the group

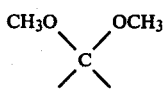

Q represents an oxygen atom, X, Y, Z, m, n and p have the indicated meanings, and also those compounds which are obtained by starting from isoindolines of the formula (IX) wherein V represents the group of the formula

Q represents an imino group, and X, Y, Z, m, n and p have the indicated meanings.

Preferred compounds are obtained by starting from isoindolin-1-ones of the formula

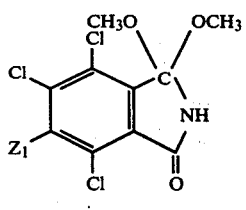

wherein $Z_1$ represents a chlorine atom or a group of the formula $R_2—O—$, wherein $R_2$ represents a methyl or ethyl group or a phenyl group which is unsubstituted or substituted in the o-, p- or m-position by chlorine atoms or methyl groups.

Preferred compounds are also obtained by starting from 1,3-diiminoisoindolines of the formula

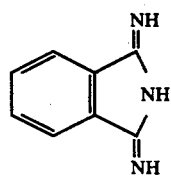

Particularly interesting compounds are those which are obtained by starting from a bis-cyanacetamide of the formula

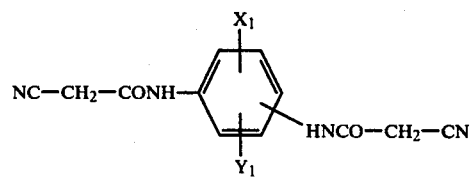

wherein each of $X_1$ and $Y_1$ independently represents a hydrogen or chlorine atom, a $C_1$-$C_4$-alkyl or $C_1$-$C_4$-alkoxy group, and also those compounds which are obtained by starting from a bis-cyanacetamide of the formula

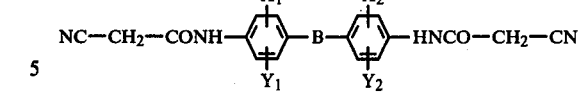

wherein B represents a direct bond, an oxygen or sulphur atom, a $C_1$-$C_4$-alkylene or $C_1$-$C_4$-alkylenedioxy group, a phenylenedioxy group, an azo, sulpho, or carbamoyl group, each of $X_1$, $X_2$, $Y_1$ and $Y_2$ independently represents a hydrogen or chlorine atom or a $C_1$-$C_4$-alkyl or $C_1$-$C_4$-alkoxy group.

Preferred compounds are obtained by starting from a bis-cyanacetamide of the formula

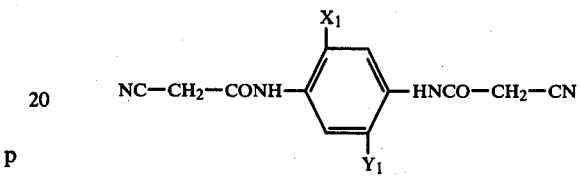

wherein each of $X_1$ and $Y_1$ independently represents a hydrogen or chlorine atom, or a methyl, ethyl, methoxy or ethoxy group.

Preferred compounds are also obtained by starting from a bis-cyanacetamide of the formula

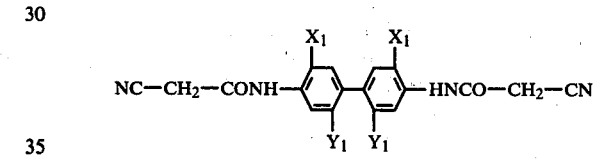

wherein $X_1$ and $Y_1$ have the indicated meanings.

Suitable isoindolinines are preferably the 3,3-dimethoxy-isoindolin-1-ones, 3-imino-isoindolin-1-ones and 1-amino-3-imino-isoindolenines which are obtained by known methods from methyl o-cyanobenzoate and phthalodinitrile derivatives. Bis-isoindolin-1-one pigments are obtained from 3,3-dimethoxy-isoindolin-1-ones and 3-imino-isoindolin-1-ones, and bis-1-imino-isoindoline pigments are obtained from 1-amino-3-imino-isoindolenines.

As examples of isoindolines to be used according to the invention there may be mentioned:
3,3-dimethoxy-4,5,6,7-tetrachloro-isoindolin-1-one
3,3-dimethoxy-4,5,6,7-tetrabromo-isoindolin-1-one
3-imino-5,6-dichloro-isoindolin-1-one
3-imino-5,6-dibromo-isoindolin-1-one
3,3,6-trimethoxy-4,5,7-trichloro-isoindolin-1-one
3-imino-4,5,7-trichloro-6-phenoxy-isoindolin-1-one
3-imino-4,5,7-trichloro-6-methylmercapto-isoindolin-1-one
3,3-dimethoxy-4,5,7-trichloro-6-phenylmercapto-isoindolin-1-one
3,3-dimethoxy-6-butoxy-4,5,7-trichloro-isoindolin-1-one
3-imino-7-chloro-4-phenylmercapto-isoindolin-1-one
3-imino-isoindolin-1-one (imino-phthalimide)
3,3-dimethoxy-4-nitro-isoindolin-1-one
3,3-dimethoxy-6-nitro-isoindolin-1-one
3,3-dimethoxy-4,6-dichloro-isoindolin-1-one
3,3-dimethoxy-4,6-dibromo-isoindolin-1-one
3,3-dimethoxy-4,5,7-trichloro-6-phenoxy-isoindolin-1-one 3,3-dimethoxy-4,5,7-trichloro-6-(4'-chlorophenoxy)-isoindolin-1-one
3-imino-4,5,6,7-tetrachloro-isoindolin-1-one
3,3-dimethoxy-4,7-dichloro-isoindolin-1-one
3,3-dimethoxy-4-chloro-isoindolin-1-one
3,3-dimethoxy-4,5,7-trichloro-6-ethoxy-isoindolin-1-one
3,3-dimethoxy-5-methoxycarbonyl-isoindolin-1-one
1-amino-3-imino-isoindolenine
1-amino-3-imino-4,5,6,7-tetrachloroisoindolenine
1-amino-3-imino-5,6-dichloroisoindolenine The bis-acetamides of the formula (X) to be used according to the invention are obtained by known methods, for example by reacting cyanoacetates or cyanoacetic chloride in the molar ratio 2:1 with, for example, one of the following diamines:
p-phenylenediamine
m-phenylenediamine
2-chloro-1,4-phenylenediamine
2-methyl-1,4-phenylenediamine
2-ethyl-1,4-phenylenediamine
2-n-propyl-1,4-phenylenediamine
2-isopropyl-1,4-phenylenediamine
2-tert.-butyl-1,4-phenylenediamine
2-methoxy-1,4-phenylenediamine
2-ethoxy-1,4-phenylenediamine
2-tert.-butoxy-1,4-phenylenediamine
2,5-dichloro-1,4-phenylenediamine
2,5-dimethyl-1,4-phenylenediamine
2,5-diethyl-1,4-phenylenediamine
2,5-dimethoxy-1,4-phenylenediamine
2,5-diethoxy-1,4-phenylenediamine
2-chloro-5-methyl-1,4-phenylenediamine
2-chloro-5-methoxy-1,4-phenylenediamine
2-methyl-5-methoxy-1,4-phenylenediamine
2,6-dichloro-1,4-phenylenediamine
2,6-dimethyl-1,4-phenylenediamine
2-chloro-6-methoxy-1,4-phenylenediamine
2-chloro-1,3-phenylenediamine
2-methyl-1,3-phenylenediamine
2-methoxy-1,3-phenylenediamine
2,5-dichloro-1,3-phenylenediamine
2,5-dimethyl-1,3-phenylenediamine
2-chloro-5-methyl-1,3-phenylenediamine
benzidine
3,3'-dichlorobenzidine
o-tolidine
3,3'-diethylbenzidine
3,3'-diisopropylbenzidine
3,3'-di-tert.-butylbenzidine
o-dianisidine
3,3',5,5'-tetrachlorobenzidine
3,3',5,5'-tetramethylbenzidine
3,3',5,5'-tetramethoxybenzidine
3,3'-dichloro-5,5'-dimethylbenzidine
3,3'-dichloro-5,5'-dimethoxybenzidine
3,3'-dimethyl-5,5-dimethoxybenzidine
1,5-naphthylenediamine
2,6-naphthylenediamine
4,4'-diaminodiphenylmethane
4,4'-diaminodiphenylisopropane
4,4'-diaminodiphenoxymethane
4,4'-diaminodiphenyl ether
4,4'-diaminodiphenylsulphide
4,4'-diaminodiphenylsulphone
4,4'-diaminoazobenzene
1,4-di-(4'-aminophenoxy)-benzene
4,4'-diaminodiphenyl-carbamide The condensation of the isoindoline of the formula (IX) with the bis-acetamide of the formula (X) is carried out in a manner known per se advantageously in an organic solvent, for example an alcohol, such as methanol, ethanol, isopropanol or ethylene glycol monoethyl ether, glacial acetic acid, o-dichlorobenzene, dimethyl acetamide, dimethyl sulphoxide, N-methylpyrrolidone, dioxane, nitrobenzene or dimethyl formamide, at elevated temperature.

Since the resultant condensation products are sparingly soluble in the above solvents, they can be easily isolated by filtration. Any impurities can be removed by washing off.

The pigments have in general a good texture and can be widely used as crude products. If necessary or desired, the crude products can be converted into a finely dispersed form by grinding or kneading, advantageously using grinding assistants, such as inorganic and/or organic salts in the presence or absence of organic solvents. After the grinding procedure, the assistants are removed in the conventional manner: soluble inorganic salts for example with water, and water-insoluble assistants for example by steam distillation. The properties of the crude pigments can often be improved by treating them with organic solvents, preferably those having a boiling point above 100° C.

The pigments obtained according to the invention are suitable for colouring organic material of high molecular weight of natural or synthetic origin. Such material can comprise for example natural resins, drying oils or rubber. However, it can also comprise modified natural materials, for example chlorinated rubber, oil-modified alkyd resins or viscose or cellulose derivatives, such as acetyl cellulose and nitrocellulose, and in particular man-made organic polyplastics, that is to say, plastics which are obtained by the polymerisation, polycondensation and polyaddition. The following products may be mentioned in particular as belonging to this class of plastics: polyethylene, polypropylene, polyisobutylene, polystyrene, polyvinyl chloride, polyvinyl acetate, polyacrylonitrile, polyacrylates, polymethacrylates; polyesters, in particular esters of high molecular weight of aromatic polycarboxylic acids and polyfunctional alcohols; polyamides, the condensation products of formaldehyde and phenols (phenolic plastics), and the condensation products of formaldehyde and urea, thiourea and melamine (aminoplasts); the polyesters used as varnish gums, namely both saturated polyesters, for example alkyd resins, and unsaturated polyesters, for example maleic resins, and also the polyaddition and polycondensation products of epichlorohydrin and polyols or polyphenols known as epoxide resins; in addition thermoplasts, i.e. the non-curable polyplastics. It should be mentioned that not only the homogeneous compounds can be pigmented according to the invention, but also mixtures of polyplastics, as well as co-condensates and copolymers, for example those based on butadiene.

The pigments of the present invention are particularly suitable for colouring polyplastics, such as the film formers or binders known as vehicles, especially for colouring boiled linseed oil, nitrocellulose, alkyd resins, melamine resins and urea-formaldehyde resins. The pigmenting of the organic substances of high molecular weight with the pigments of the formula (I) is effected for example by mixing such a pigment, optionally in the form of masterbatches, with these substrates using roll mills, mixing or grinding devices. The pigmented material is thereafter brought into the desired final form by known processes, such as calendering, pressing, extruding, coating, casting, or by injection moulding. It is often desirable to add plasticisers to the compounds of high molecular weight before forming them in order to obtain non-rigid moulded articles or to diminish their brittleness. Examples of such plasticisers are esters of phosphoric acid, phthalic acid or sebacic acid. The plasticisers can be added in the process of the invention before or after the incorporation of the pigment dye in the polyplastics. In order to obtain different shades it is also possible to add, apart from the compounds of the formula (I), fillers or other colouring constituents, such as white, coloured or black pigments, in any amounts to the organic substances.

For pigmenting lacquers and printing inks, the organic materials of high molecular weight and the compounds of the formula (I), optionally together with additives, such as fillers, other pigments, siccatives or plasticisers, are finely dispersed or dissolved in a joint organic solvent or solvent mixture. The procedure can consist for example in dispersing or dissolving each of the components individually or also several jointly, and only thereafter combining all the components.

The pigmented organic materials of high molecular weight contain normally amounts from 0.001 to 30% by weight of a compound of the formula (I), referred to the organic substance of high molecular weight to be pigmented. Polyplastics and lacquers contain preferably 0.1 to 5% by weight, and printing inks contain preferably 10 to 30% by weight. The amount of pigment to be chosen depends primarily on the desired colour strength, on the layer thickness of the moulded article, and finally also on the content of white pigment, if any, in the polyplastic.

The pigments of the present invention are characterised by good general fastness properties, in particular by fastness to light, migration, weathering, overstripe bleeding, heat and solvents, and also by good dispersibility, high colour strength, brilliance and gloss.

The invention is illustrated by the following Examples.

EXAMPLE 1

15.6 g of methyl 3,4,5,6-tetrachloro-o-cyanobenzoate are added to a solution of 70 ml of methanol and 2.7 g of sodium methylate and the mixture is stirred for half an hour, in the course of which a solution is obtained accompanied by the formation of 3,3-dimethoxy-4,5,7,6-tetrachloro-isoindolin-1-one. Then 6.05 g of bis-(cyanoacetyl)-p-phenylenediamine are added and the batch is stirred for 15 hours at room temperature. The thick reaction mass is diluted with methanol, homogenised, and acidified with 5 ml of glacial acetic acid, then heated. The methanol which distills off is replaced by o-dichlorobenzene. The temperature of the reaction mixture is raised to 150° C. and kept thereat for 2 hours. The reaction mixture is then cooled to 100° C. and the precipitate is collected by suction filtration, washed with methanol, acetone and water and dried, affording 15.7 g of a yellowish brown pigment which can be used direct for the colouration of lacquers and plastics. For example, polyvinyl chloride sheets can be coloured with this pigment in strong yellowish brown shades which are completely fast to migration and are characterised by excellent lightfastness properties.

Table 1 lists further pigments of the formula

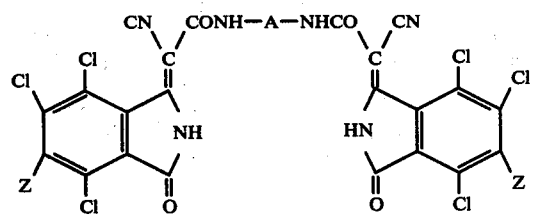

which are obtained in analogous manner by condensing o-cyanobenzoates of the formula

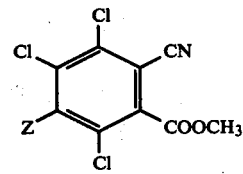

with cyanoacetic arylides of the formula

$CNCH_2COHN-A-NHCOCH_2CN$.

The diamines are listed in column III, and column IV indicates the shades in which polyvinyl chloride sheets are coloured with these pigments. They have both good fastness to migration and to light.

Table 1

| No. | Z | $H_2N-A-NH_2$ | Shade in PVC |
|---|---|---|---|
| 2 | Cl | 2,5-dimethyl-p-phenylene-diamine | yellowish brown |
| 3 | —OCH₃ | p-phenylenediamine | yellowish brown |
| 4 | Cl | o-dianisidine | red |
| 5 | Cl | 2,5-dichloro-p-phenylene-diamine | yellow |
| 6 | Cl | m-phenylenediamine | yellowish brown |
| 7 | Cl | 3,3'-dichlorobenzidine | yellowish brown |
| 8 | Cl | 4,4'-diaminodiphenylmethane | yellow |
| 9 | Cl | 2,5-diethoxy-p-phenylenediamine | violet |
| 10 | Cl | 2-chloro-p-phenylenediamine | yellowish brown |
| 11 | Cl | 2-chloro-5-methyl-p-phenylene-diamine | orange |
| 12 | Cl | 4-amino-benzoyl-p-phenylene-diamine | yellowish brown |
| 13 | Cl | 2,6-diaminotoluene | yellow |
| 14 | Cl | benzidine | reddish brown |
| 15 | Cl | o-tolidine | reddish brown |
| 16 | Cl | 4,4'-diamino-diphenoxymethane | orange |

Table 1-continued

| No. | Z | H₂N—A—NH₂ | Shade in PVC |
|---|---|---|---|
| 17 | 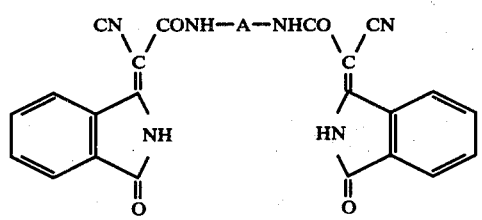 | 3,3'-dichlorobenzidine | orange |
| 18 | CH₃O— | 1,5-naphthylenediamine | orange |
| 19 | | p-phenylenediamine | yellowish brown |
| 20 | CH₃O— | 2,5-diethoxy-p-phenylenediamine | violet |

(Row 19's Z group shown as phenyl-O— structure)

EXAMPLE 21

With good stirring, 12.2 g of 3-imino-phthalimide hydrochloride and 8.1 g of bis-(cyanoacetyl)-p-phenylenediamine are heated for 10 hours to 145°–150° C. in 100 ml of Carbitol. The reaction mixture is cooled to room temperature and the precipitate which has formed is collected by suction filtration, washed with methanol and water and dried, affording 7.9 g of a yellow pigment. This pigment is freely dispersed for example by grinding it in isopropanol with the aid of grinding assistants. A lacquer pigmented with this pigment has a clear, yellow shade of good fastness to overstripe bleeding.

Table 2 lists further pigments of the formula

which are obtained in analogous manner by using, instead of bis-(cyanacetyl)-p-phenylenediamine, other cyanoacetic arylides of the formula

CNCH₂COHN—A—NHCOCH₂CN.

The diamines are listed in column II and column III indicates the shade of the lacquers.

Table 2

| No. | H₂N—A—NH₂ | Shade in the lacquer |
|---|---|---|
| 22 | o-dianisidine | brown |
| 23 | 2,5-dimethyl-p-phenylenediamine | yellow |
| 24 | 3,3'-dichlorobenzidine | yellow |

EXAMPLE 25

14.1 g of phthalodinitrile are heated to 45°–50° C. in 35 g of dimethyl sulphoxide. Then 16 g of conc. sodium hydroxide solution are added dropwise with stirring in the course of 30 minutes and with water cooling to ensure that the temperature does not exceed 55° C. When the addition is complete, the temperature is kept for a further 2 hours at 55° C. and then 10.6 g of bis-(cyanacetyl)-p-phenylenediamine are added. The colourant begins to precipitate and the reaction mixture becomes increasingly more viscous. The reaction mixture is diluted with 20 ml of dimethyl sulphoxide and the temperature is raised to 75° C. After 1 hour 80 ml of methanol are added and the batch is well stirred, then acidified with 15 ml of conc. hydrochloric acid and cooled to room temperature. The orange yellow colourant is collected by suction filtration, washed with methanol and dried, affording 16.7 g of crude product.

The crude product is heated in 200 ml of dimethyl formamide with stirring for 1 hour to reflux temperature. During this aftertreatment, the shade changes to greenish yellow. After filtration at 100° C. and washing the filter cake to greenish yellow. After filtration at 100° C. and washing the filter cake with methanol, the same pigment is obtained as in Example 21. The pigments of Table 3 are obtained by replacing in this Example the bis-(cyanoacetyl)-p-phenylenediamine by the compounds of the formula

CNCH₂COHN—A—NHCOCH₂CN.

The diamines are listed in column II and column III indicates the shade in the lacquers.

Table 3

| No. | H₂N—A—NH₂ | Shade in lacquers |
|---|---|---|
| 26 | 2,5-dichloro-p-phenylenediamine | yellow |
| 27 | 4,4'-diaminodiphenylmethane | yellow |
| 28 | 2-methoxy-p-phenylenediamine | reddish yellow |
| 29 | o-dianisidine | reddish brown |
| 30 | 1,5-diaminonaphthalene | reddish yellow |
| 31 | 4,4'-diaminodiphenoxymethane | yellow |

The same pigment is obtained by replacing dimethyl sulphoxide in Example 25 by N-methylpyrrolidone, ethyl cellosolve or diethylene glycol monoethyl ether.

EXAMPLE 32

The procedure of Example 1 is repeated using the o-cyanobenzoates of column II of Table 4 instead of the methyl tetrachloro-o-cyanobenzoate and condensing them with the cyanoacetic arylides of the general formula

CNCH₂COHN—A—HNCOCH₂CN, giving pigments which are suitable for pigmenting polyvinyl chloride sheets. The diamines are listed in column III and column IV indicates the shade of the pigments. The colourations are fast to migration and light.

Table 4

| No. | Methyl-o-cyanobenzoate | H₂N—A—NH₂ | Shade in PVC |
|---|---|---|---|
| 33 |  | p-phenylenediamine | yellow |
| 34 | " | 2,5-dichloro- | yellow |

Table 4-continued

| No. | Methyl-o-cyanobenzoate | H₂N—A—NH₂ | Shade in PVC |
|---|---|---|---|
| 35 | " | p-phenylene-diamine | |
| | | 2,5-dimethyl-p-phenylene-diamine | yellow |
| 36 | CH₃OOC—[ring]—CN, COOCH₃ | p-phenylene-diamine | orange yellow |
| 37 | Cl—[ring]—CN, COOCH₃, Cl | " | yellowish brown |
| 38 | Cl—[ring]—CN, COOCH₃ | " | yellow |
| 39 | NO₂—[ring]—CN, COOCH₃ | " | yellowish brown |
| 40 | NO₂—[ring]—CN, COOCH₃ | o-dianisidine | yellow |
| 41 | CH₃OOC—[ring]—CN, COOCH₃ | " | orange |

EXAMPLE 42

15.5 g of 1-amino-3-imino-isoindolenine and 6.2 g of bis-(cyanoacetyl)-2,5-dichloro-p-phenylenediamine are stirred in 100 ml of dimethyl formamide for 1 hour at room temperature. The reaction mixture is then heated for 1 hour to 120° C. The pigment which has formed is collected by suction filtration, washed with methanol and dried, affording 9.7 g of a pure yellow pigment which can be used direct for colouring lacquers and plastics. The pigmented lacquers have a clear yellow shade, are fast to overstripe bleeding and have good resistance to weathering.

Table 5 lists further pigments of the formula

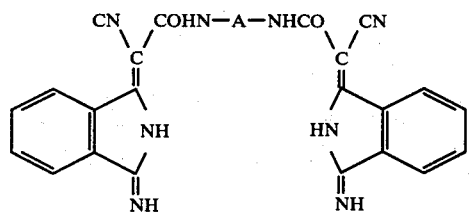

They are obtained in analogous manner by replacing bis-(cyanoacetyl)-2,5-dichloro-p-phenylenediamine by compounds of the formula

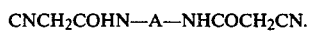

CNCH₂COHN—A—NHCOCH₂CN.

The diamines are listed in column II and column III indicates the shade of the pigmented lacquers.

Table 5

| No. | H₂N—A—NH₂ | Shade in lacquer |
|---|---|---|
| 43 | 3,3'-dichlorobenzidine | orange yellow |
| 44 | p-phenylenediamine | orange |
| 45 | o-dianisidine | brown |
| 46 | 2,5-diethoxy-p-phenylenediamine | greyish violet |
| 47 | 2,5-dimethyl-p-phenylenediamine | orange |
| 48 | 2-chloro-p-phenylenediamine | yellow |
| 49 | 2-chloro-5-methyl-p-phenylenediamine | yellow |
| 50 | 2-chloro-5-methoxy-p-phenylenediamine | brown |
| 51 | 1,5-naphthylendiamine | orange brown |
| 52 | 4,4'-diaminodiphenylcarbamide | yellow |
| 53 | 2,6-diaminotoluene | yellow |
| 54 | 4,4'-diamino-diphenoxy-methane | yellow |
| 55 | o-tolidine | orange |

EXAMPLE 56

The procedure of Example 42 is repeated, replacing the 1-amino-5-imino-isoindolenine by the isoindolines listed in column II of Table 6 and condensing them with the cyanoacetic arylides of the formula

CNCH₂COHN—A—NHCOCH₂CN, to give pigments which are suitable for pigmenting lacquers. The diamines are listed in column III and column IV indicates the shade of the pigmented lacquers.

Table 6

| No. | Isoindolenine | H₂N—A—NH₂ | Shade in the lacquer |
|---|---|---|---|
| 57 | Cl,Cl-[ring with NH,N,NH₂] | p-phenylenediamine | yellowish brown |
| 58 | " | 2,5-dichloro-p-phenylenediamine | yellow |
| 59 | Cl,Cl,Cl,Cl-[ring with NH,N,NH₂] | p-phenylenediamine | brown |

EXAMPLE 60

2 g of the pigment obtained in Example 1 are gound with 36 g of toner dehydrate, 60 g of boiled linseed oil of medium viscosity and 2 g of cobalt linoleate on a three roll mill. The yellowish brown prints obtained with the resultant colour paste are strong and fast to light.

EXAMPLE 61

0.6 g of the pigment obtained in Example 1 is mixed with 67 g of polyvinyl chloride, 33 g of dioctyl phthalate, 2 g of dibutyl tin dilaurate and 2 g of titanium dioxide and the mixture is processed to a thin sheet for 15 minutes at 160° C. on a roll mill. The yellowish brown colouration obtained is strong and fast to migration, heat and light.

EXAMPLE 62

10 g of titanium dioxide and 2 g of the pigment obtained in Example 42 are ground for 48 hours in a ball mill with 88 g of a mixture of 26.4 g of coconut alkyd resin, 24 g of melamine/formaldehyde resin (50% solids content), 8.8. g of ethylene glycol monomethyl ether and 28.8 g of xylene. The resultant lacquer is sprayed onto an aluminum sheet, predried for 30 minutes at room temperature and then stoved for 30 minutes at 120° C., to give a yellow finish which has very good colour strength and is characterised by very good fastness to over-stripe bleeding and light.

What we claim is:

1. A bis-isoindoline pigment of the formula

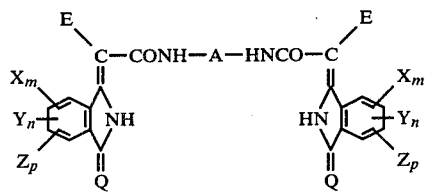

wherein E is cyano and A is

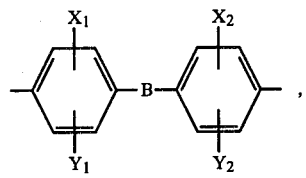

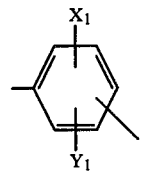

or 1,5- or 2,6-naphthylene.

where B is a direct bond, —O—, —S—, —$C_1$–$C_4$-alkylene, -$C_1$–$C_4$-alkylenedioxy, phenylenedioxy, sulfonyl or —NHCO—; and $X_1$, $X_2$, $Y_1$ and $Y_2$ are independently hydrogen, chloro, $C_1$–$C_4$ alkyl or $C_1$–$C_4$ alkoxy;

Q is oxo or imino;

X is hydrogen;

Y is chloro or bromo;

m and n are integers from 0–4;

p is an integer from 0 to 1, with the proviso that the sum of m+n+p must be 4; and Z is nitro or $C_2$–$C_5$ alkoxycarbonyl when p is 1 and m is 3; or is chloro or RW— where W is —O— or —S— when p is 1, and n is 3, where R is $C_1$–$C_4$-alkyl, phenyl, or phenyl substituted in the o-, p- or m- position by halo, $C_1$–$C_4$-alkyl or $C_1$–$C_4$ alkoxy.

2. A bis-isoindoline pigment according to claim 1 of the formula

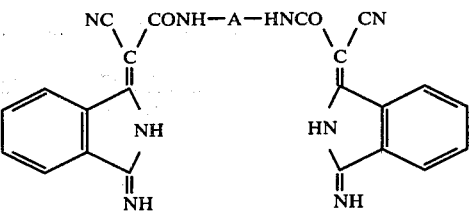

3. A bis-isoindoline pigment according to claim 1 of the formula

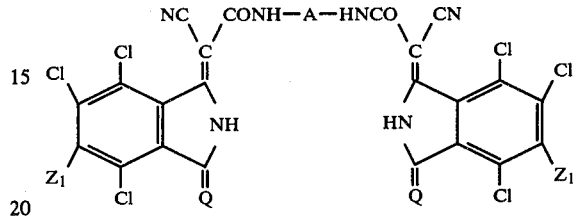

wherein $Z_1$ is chloro or $R_2$—O— where $R_2$ is methyl, ethyl, or phenyl which is unsubstituted or substituted in the o-, p- or m-position by chloro or methyl.

4. A bis-isoindoline pigment according to claim 3 wherein A is a group of the formula

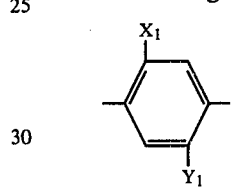

where $X_1$ and $Y_1$ independently represent hydrogen, chloro, methyl, ethyl, methoxy or ethoxy.

5. A bis-isoindoline pigment according to claim 2 wherein A is a group of the formula

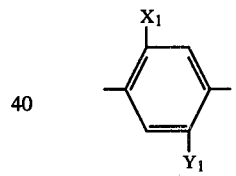

where $X_1$ and $Y_1$ independently represent hydrogen, chloro, methyl, ethyl, methoxy or ethoxy.

6. A bis-isoindoline pigment according to claim 3 wherein A is a group of the formula

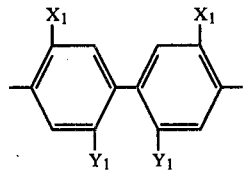

where each of $X_1$ and $Y_1$ independently represent hydrogen, chloro, methyl, ethyl, methoxy or ethoxy.

7. A bis-isoindoline pigment according to claim 2 wherein A is a group of the formula

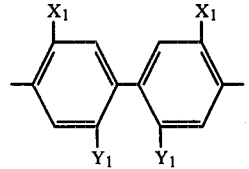

where each of $X_1$ and $Y_1$ independently represent hydrogen, chloro, methyl, ethyl, methoxy or ethoxy.

* * * * *